(12) United States Patent
Dong

(10) Patent No.: US 9,883,684 B1
(45) Date of Patent: Feb. 6, 2018

(54) METHOD AND SYSTEM OF STIRRING LIQUID FORM MATERIAL

(71) Applicant: Lingyu Dong, Temple City, CA (US)

(72) Inventor: Lingyu Dong, Temple City, CA (US)

( * ) Notice: Subject to any disclaimer, the term of this patent is extended or adjusted under 35 U.S.C. 154(b) by 0 days.

(21) Appl. No.: 15/279,381

(22) Filed: Sep. 28, 2016

(51) Int. Cl.
| | |
|---|---|
| *A23G 9/12* | (2006.01) |
| *B01F 15/06* | (2006.01) |
| *B01F 7/00* | (2006.01) |
| *B01F 15/00* | (2006.01) |
| *A23G 9/22* | (2006.01) |

(52) U.S. Cl.
CPC ............... *A23G 9/12* (2013.01); *A23G 9/224* (2013.01); *A23G 9/225* (2013.01); *B01F 7/0025* (2013.01); *B01F 15/00538* (2013.01); *B01F 15/06* (2013.01); *B01F 2015/061* (2013.01); *B01F 2215/0021* (2013.01)

(58) Field of Classification Search
CPC .......... A23G 9/12; A23G 9/224; A23G 9/225; B01F 15/00538; B01F 7/0025; B01F 15/06; B01F 2015/061; B01F 2215/0021
See application file for complete search history.

(56) References Cited

U.S. PATENT DOCUMENTS

| | | | | | |
|---|---|---|---|---|---|
| 2,964,301 | A | * | 12/1960 | Bosse | B01F 7/0015 366/329.3 |
| 3,488,038 | A | * | 1/1970 | Staaf | B01F 7/22 261/113 |
| 4,619,116 | A | * | 10/1986 | Cristante | A23G 9/12 366/144 |

* cited by examiner

*Primary Examiner* — Emmanuel Duke
(74) *Attorney, Agent, or Firm* — Raymond Y. Chan; David and Raymond Patent Firm

(57) ABSTRACT

A stirrer arrangement for an ice-cream or yogurt machine includes a motor shaft hub adapted for coupling at a shaft of a motor within a chilling container, and a stirring blade unit which includes a plurality of blade members radially and outwardly extended from the motor shaft hub. Each of the blade members has an inclined pushing surface, such that when the motor shaft hub is rotated at a stirring direction, the blade members are spun for creating a radial stirring vortex within the chilling container to outwardly, radially, and upwardly push liquid material from a bottom of the chilling container to a top thereof and to inwardly, radially, and downwardly suck the liquid material from the top of the chilling container to the bottom thereof.

26 Claims, 6 Drawing Sheets

METHOD AND SYSTEM OF STIRRING LIQUID FORM MATERIAL

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a mixing machine, and more particularly to a method and system of stirring liquid form material, such as raw material of frozen product, for creating a radial stirring vortex to efficiently stirring the liquid material in a chilling container.

Description of Related Arts

A mixing machine, such as an ice cream making machine, generally comprises a stirrer disposed in a chilling container for stirring liquid material therein. A conventional stirrer comprises a rotatable shaft being driven to rotate by a motor and a plurality of flat blades or helical blades radially extended from the rotatable shaft, such that when the rotatable shaft is rotated, the stirrer creates a vertical vortex within the chilling container. For example, the stirrer in the ice cream making machine will mix the raw liquid material to make the finished ice cream. It is worth mentioning that the vertical vortex has a center defined at the rotatable shaft and a diameter gradually increasing from bottom to top, such that the liquid material is whirled to be pushed from the bottom of the chilling container to the top thereof. However, the major drawback of the vertical vortex is that only the liquid material at the bottom-center portion of the chilling container will be whirled. In other words, the vertical vortex cannot effectively whirl the liquid material at the bottom-peripheral portion of the chilling container. In fact, the liquid material will gradually precipitate and remain at the bottom-peripheral portion of the chilling container. Since the liquid material is viscous, the liquid material will become more thicker and sticker at the bottom-peripheral portion of the chilling container. On the other hand, the velocity of the vertical vortex can be increased to enlarge the diameter coverage of the vertical vortex for reaching the liquid material at the bottom-peripheral portion of the chilling container. However, the upward pushing force of the vertical vortex will also be increased to push the liquid material from the bottom of the chilling container to the top thereof. The increasing upward pushing force will cause the liquid material to spill out of the chilling container. In other words, a deeper chilling container is needed. As a result, the size of the stirrer, the velocity of the stirrer, and the size of the chilling container must be well-configured corresponding to the volume of the liquid material.

A need exists for a stirrer that creates a radial stirring vortex to efficiently stirring the liquid material in the chilling container. It is to the provision of such a stirrer that the present disclosure is primarily directed.

SUMMARY OF THE PRESENT INVENTION

The invention is advantageous in that it provides a method and system of stirring liquid form material, such as raw material of frozen product, for creating a radial stirring vortex to efficiently stirring the liquid material in a chilling container.

Another advantage of the invention is to a method and system of stirring liquid form material, wherein through the radial stirring vortex of the stirrer arrangement, the liquid material is outwardly, radially, and upwardly pushed from the bottom of the chilling container to the top thereof and is then inwardly, radially, and downwardly sucked from the top of the chilling container to the bottom thereof. In other words, the liquid material at the bottom-peripheral portion of the chilling container will be whirled via the radial stirring vortex of the stirrer arrangement.

Another advantage of the invention is to a method and system of stirring liquid form material, wherein the liquid will not be easily spilled out of the chilling container by the radial stirring vortex of the stirrer arrangement.

Another advantage of the invention is to a method and system of stirring liquid form material, wherein the stirrer has a simple structure to minimize the manufacturing cost of the stirrer.

Another advantage of the invention is to a method and system of stirring liquid form material, wherein the stirrer is able to incorporate with any existing chilling container to mix and stir the liquid material without altering its originally structural design.

Another advantage of the invention is to a method and system of stirring liquid form material, which does not require to alter the original structural design of the chilling container, so as to minimize the manufacturing cost of the chilling container incorporating with the stirrer of the present invention.

Another advantage of the invention is to a method and system of stirring liquid form material, wherein no expensive or complicated structure is required to employ in the present invention in order to achieve the above mentioned objects. Therefore, the present invention successfully provides an economic and efficient solution for efficiently stirring the liquid material in the chilling container.

Additional advantages and features of the invention will become apparent from the description which follows, and may be realized by means of the instrumentalities and combinations particular point out in the appended claims.

According to the present invention, the foregoing and other objects and advantages are attained by a stirrer arrangement for an ice-cream or yogurt machine which comprises a chilling container and a motor, comprising:

a motor shaft hub adapted for coupling at a shaft of the motor within the chilling container, wherein the motor shaft hub is driven to rotate at a stirring direction; and a stirring blade unit which comprises a plurality of blade members radially and outwardly extended from the motor shaft hub, wherein each of the blade members has an inclined pushing surface, such that when the motor shaft hub is rotated at the stirring direction, the blade members are spun for creating a radial stirring vortex within the chilling container to outwardly, radially, and upwardly push liquid material from a bottom of the chilling container to a top thereof and to inwardly, radially, and downwardly suck the liquid material from the top of the chilling container to the bottom thereof.

In accordance with another aspect of the invention, the present invention comprises an ice-cream or yogurt machine, comprising:

a chilling container for containing liquid material;

a motor which comprises a shaft extended upwardly within the chilling container; and a stirrer arrangement, which comprises:

a motor shaft hub coupled at the shaft of the motor within the chilling container, wherein the motor shaft hub is driven to rotate at a stirring direction; and a stirring blade unit which comprises a plurality of blade members radially and outwardly extended from the motor shaft hub, wherein each of the blade members has an inclined pushing surface, such that when the motor shaft hub is rotated at the stirring direction, the blade members are whirled for creating a radial stirring vortex within the chilling container to outwardly, radially, and upwardly push the liquid material from a bottom of the chilling container to a top thereof and to inwardly, radially, and downwardly suck the liquid material from the top of the chilling container to the bottom thereof.

In accordance with another aspect of the invention, the present invention comprises a method of stirring liquid material in a chilling container of an ice-cream or yogurt machine, comprising the following steps.

(A) Drive a motor shaft hub of a stirrer arrangement to rotate at a stirring direction.

(B) Create a radial stirring vortex within the chilling container by a plurality of blade members radially and outwardly extended from the motor shaft hub when the motor shaft hub is rotated, wherein each of the blade members has an inclined pushing surface, wherein through the radial stirring vortex, the liquid material in the chilling container is outwardly, radially, and upwardly pushed from a bottom of the chilling container to a top thereof and to inwardly, radially, and downwardly sucked from the top of the chilling container to the bottom thereof.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
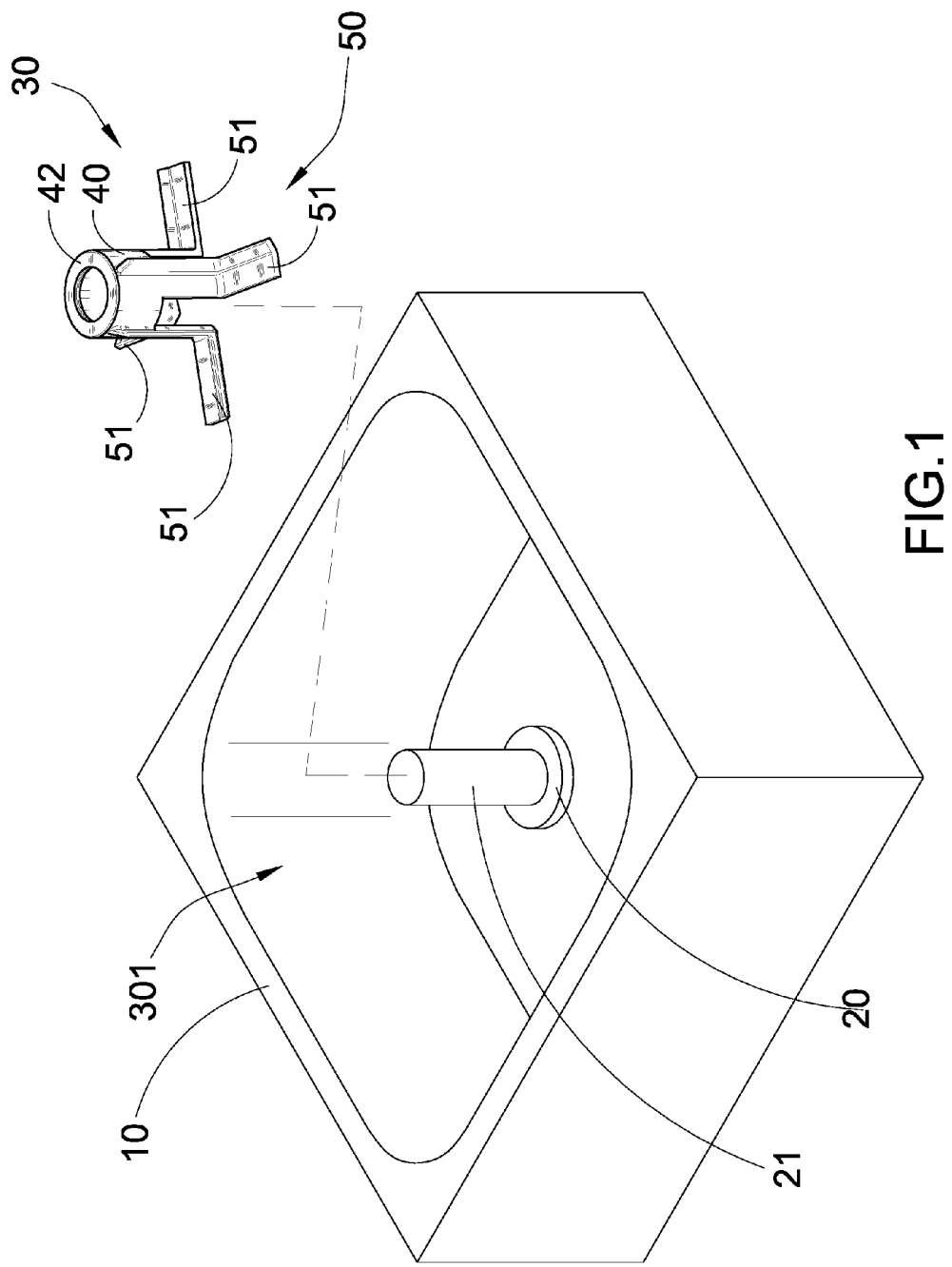
FIG. 1 is a perspective view of an ice-cream or yogurt machine according to a preferred embodiment of the present invention, illustrating a motor supported in a chilling container to incorporate with a stirring arrangement.

Referring to FIG. 1 of the drawings, an ice-cream or yogurt machine according to a preferred embodiment of the present invention is illustrated, wherein the machine comprises a chilling container 10, a motor 20 supported within the chilling container 10, and a stirring arrangement 30 disposed in the chilling container 10 and coupled at the motor 20. Accordingly, when raw liquid material is disposed in the chilling container 10, the liquid material is chilled and stirred at the same time to form an ice cream or yogurt product.

Accordingly, the motor 20 is sealed and supported at a bottom wall of the chilling container 10, wherein the motor 20 comprises a shaft 21 upwardly extended from the bottom wall of the chilling container 10 and driven to rotate. Preferably, the chilling container 10 has a hopper size of 418 mm length and 230 mm width, and 180-200 mm deep.

Figure 2:
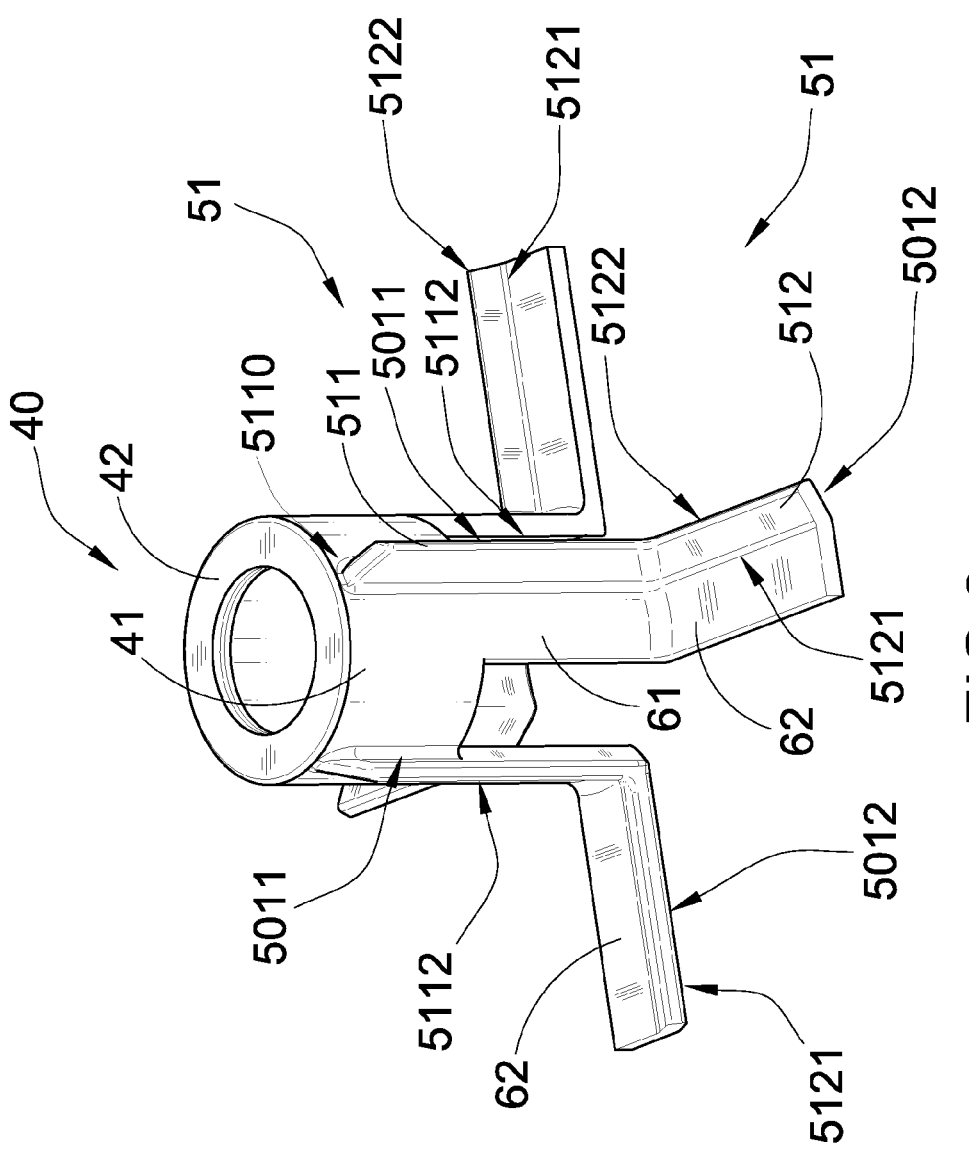
FIG. 2 is a perspective view of the stirring arrangement according to the above preferred embodiment of the present invention.
Figure 3:
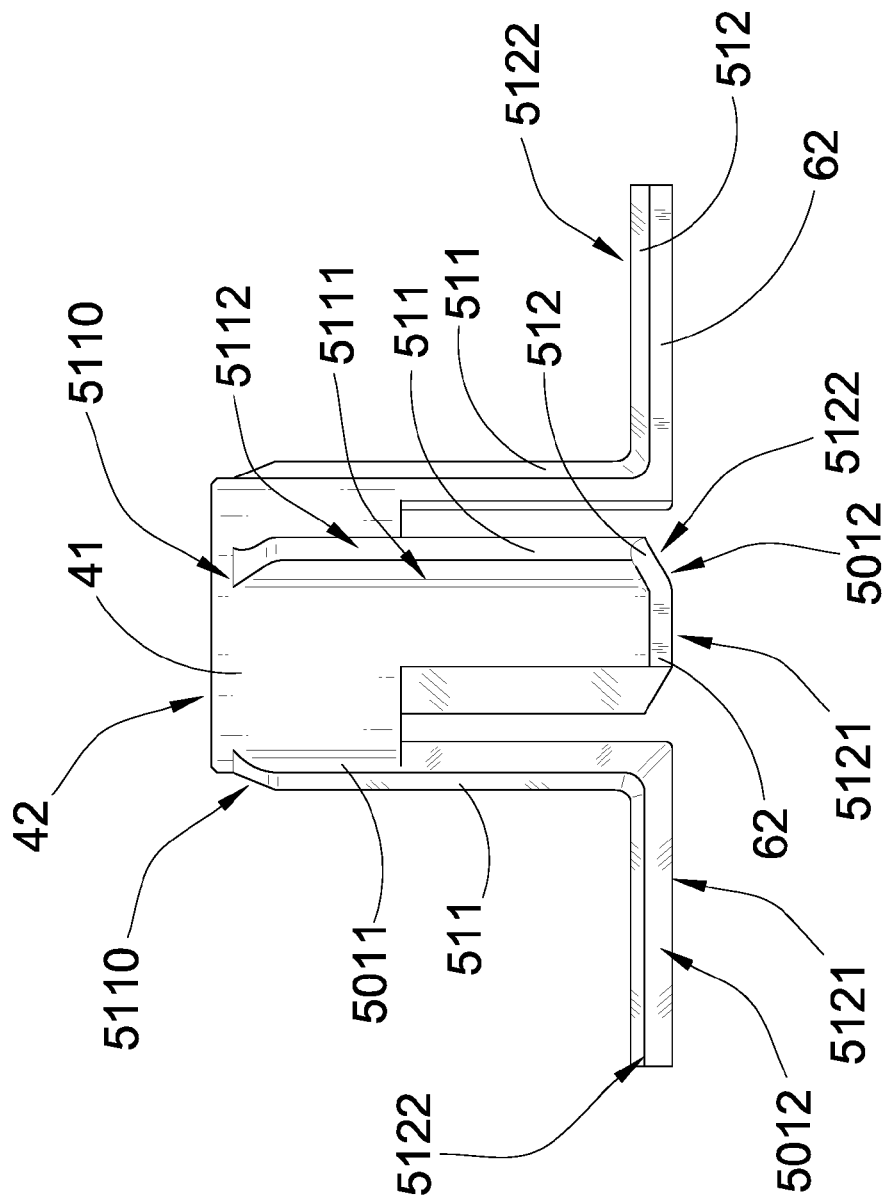
FIG. 3 is a side view of the stirring arrangement according to the above preferred embodiment of the present invention.
Figure 4:
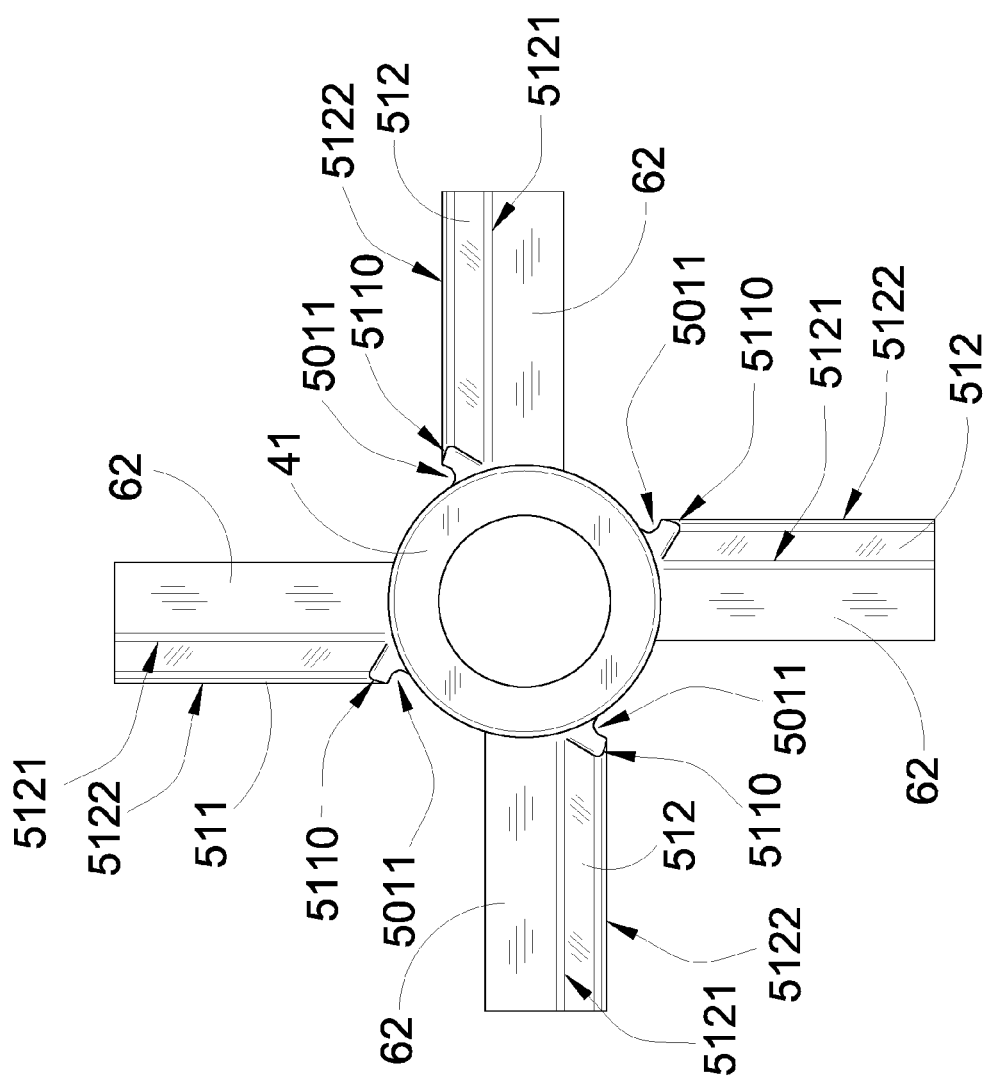
FIG. 4 is a top view of the stirring arrangement according to the above preferred embodiment of the present invention.

The stirrer arrangement 30 comprises a motor shaft hub 40 detachably coupled at the shaft 21 of the motor 20 within the chilling container 10, wherein the motor shaft hub 40 is driven to rotate by the motor 20 at a stirring direction. Accordingly, the stirring direction of the motor shaft hub 40 is defined as a forward direction thereof. As shown in FIGS. 2 to 4, the motor shaft hub 40 has a tubular configuration defining a surrounding wall 41 and an annular ceiling wall 42. The shaft 21 of the motor 20 is extended into and coupled at the surrounding wall 41 of the motor shaft hub 40.

Figure 5:
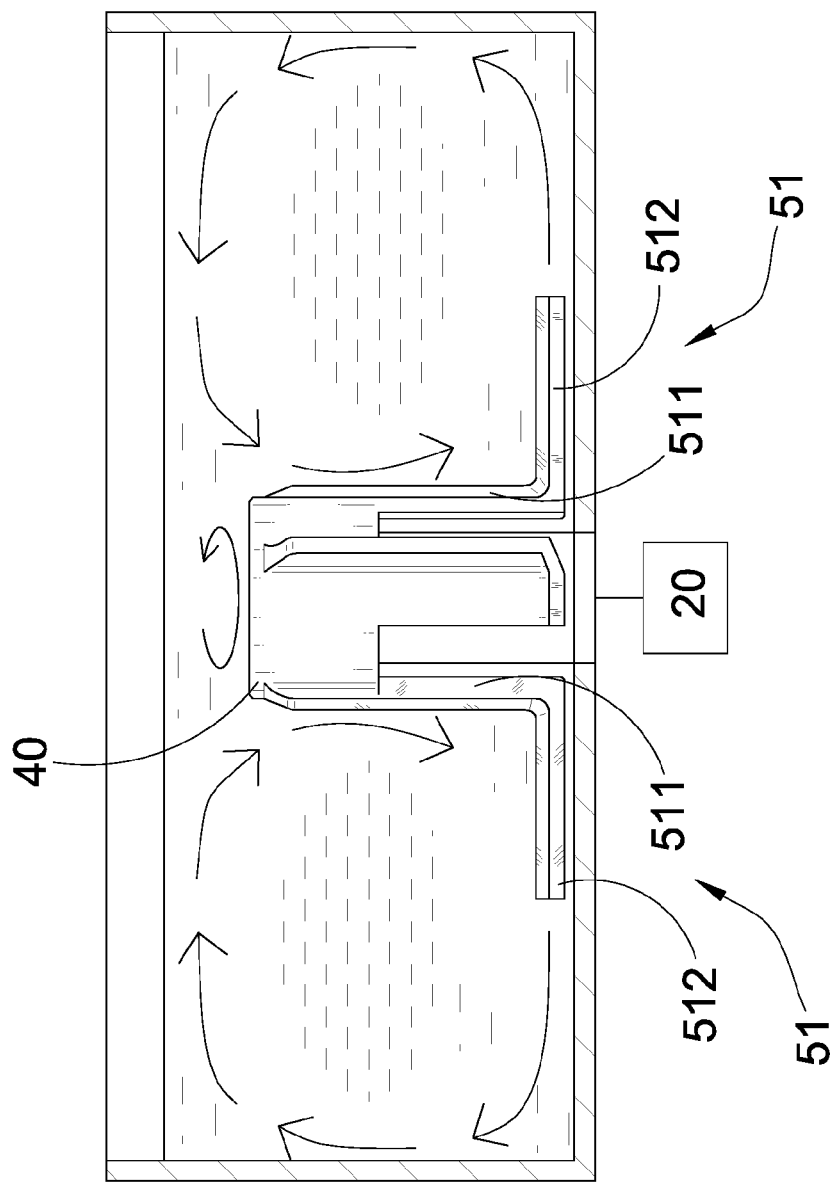
FIG. 5 illustrates a radial stirring vortex created by the stirring arrangement within the chilling container for stirring the liquid material therein according to the above preferred embodiment of the present invention.

The stirrer arrangement 30 further comprises a stirring blade unit 50 for stirring the liquid material in the chilling container 10. The stirring blade unit 50 comprises a plurality of blade members 51 radially and outwardly extended from the motor shaft hub 20, wherein each of the blade members 51 has an inclined pushing surface 501 facing against the stirring direction. In particular, when the motor shaft hub 40 is rotated at the stirring direction, the blade members 51 are whirled for creating a radial stirring vortex within the chilling container 10 to outwardly, radially, and upwardly push the liquid material from a bottom of the chilling container 10 to a top thereof and to inwardly, radially, and downwardly suck the liquid material from the top of the chilling container 10 to the bottom thereof, as shown in FIG. 5.

According to the preferred embodiment, each of the blade members 51 has a vertical blade 511 downwardly extended from the motor shaft hub 40 and a horizontal blade 512 extended from a bottom end of the vertical blade 511, such that each of the blade members 51 forms a L-shaped configuration. In particular, the vertical blade 511 is integrally extended from the motor shaft hub 40 at a position that an upper portion of the vertical blade 511 is integrally and radially extended from an outer circumferential surface of the surrounding wall 41 of the motor shaft hub 40 and a bottom portion of the vertical blade 511 is downwardly extended below the surrounding wall 41 of the motor shaft hub 40. Each of the vertical blades 511 further has a top tapered end 5110 extended towards the ceiling wall 42 of the motor shaft hub 40. Accordingly, the horizontal blades 512 are supported slightly above the bottom wall of the chilling container 10. It is worth mentioning that each of the vertical blades 511 and the horizontal blades 512 has a uniform width.

In addition, the inclined pushing surface 501 at the vertical blade 511 serves a vertical inclined pushing surface 5011 and the inclined pushing surface 501 at the horizontal blade 512 serves as a horizontal inclined pushing surface 5012. Therefore, when the motor shaft hub 40 is rotated, the vertical blades 511 and the horizontal blades 512 are spun, such that the liquid material is whirled by the vertical inclined pushing surfaces 5011 and the horizontal inclined pushing surfaces 5012. It is worth mentioning that the radial stirring vortex is created by the vertical inclined pushing surfaces 5011 and the horizontal inclined pushing surfaces 5012 at the same time when the motor shaft hub 40 is rotated.

It is worth mentioning that the inclined pushing surface 501 of each of the blade members 51 is forwardly extended at the stirring direction. The vertical blade 511 has a rear edge 5111 and a front edge 5112 radially and forwardly extended from the rear edge 5111 at the stirring direction to form the vertical inclined pushing surface 5011 between the rear edge 5111 and the front edge 5112. The horizontal blade 512 has a bottom edge 5121 and a top edge 5122 upwardly and forwardly extended from the bottom edge 5121 at the stirring direction to form the horizontal inclined pushing surface 5012 between the bottom edge 5121 and the top edge 5122. The vertical inclined pushing surface 5011 and the horizontal inclined pushing surface 5012 are flat and smooth surfaces.

When the motor shaft hub 40 is rotated, the blade members 51 are spun to generate a centrifugal force by the vertical inclined pushing surfaces 5011 and the horizontal inclined pushing surfaces 5012 to outwardly, radially, and upwardly push the liquid material. Due to the length of the horizontal blade 512 and the location of the horizontal blade 512 at the bottom of the chilling container 10, the centrifugal force generated by the horizontal blade 512 is greater than the centrifugal force generated by the vertical blade 511. Therefore, the liquid material is forced to move outwardly, radially, and upwardly from the bottom of the chilling container 10 to the top thereof. In other words, the liquid material at the bottom-peripheral portion of the chilling container 10 will be whirled via the radial stirring vortex of the stirrer arrangement 30. Due to the circulation of the liquid material within the chilling container 10, the liquid material is then moved inwardly, radially, and downwardly from the top of the chilling container 10 to the bottom thereof, such that the liquid material is moved back toward the motor shaft hub 40. The top tapered ends of the vertical blades 511 will also guide the liquid material to inwardly, radially, and downwardly to move from the top of the chilling container 10 to the bottom thereof. Therefore, the liquid material will not be easily spilled out of the chilling container 10 by the radial stirring vortex of the stirrer arrangement 30. Preferably, the stirrer arrangement 30 has an agitator spinning speed about 160 rpm.

According to the preferred embodiment, the stirrer arrangement 30 further comprises an upward guiding wall 301 encircling around the stirring blade unit 50 for guiding the liquid material to move upward when the motor shaft hub 40 is rotated. In particular, the guiding wall 301 is formed apart from outer free ends of the horizontal blades 512, wherein when the horizontal blades 512 are spun, the liquid material is moved outwardly and radially from the motor shaft hub 40. When the liquid material hits the guiding wall 301, the liquid material is guided to move upwardly. Therefore, the guiding wall 301 serves as a boundary to control the radial flowing distance of the liquid material and to guide the upward flowing distance of the liquid material. In other words, when the distance between the guiding wall 301 and the outer free ends of the horizontal blades 512 is increased, the liquid material will travel longer at the radial direction before it is guided to flow upward. Preferably, the guiding wall 301 is integrally formed with an inner wall of the chilling container 10. In other words, the inner wall of the chilling container 10 serves as the guiding wall 301.

As shown in FIGS. 2 to 4, the stirring arrangement 30 further comprises a reinforcing unit 60 for reinforcing and enhancing the strength of the stirring blade unit 50. The reinforcing unit 60 further comprising a plurality of vertical reinforcing members 61 and a plurality of horizontal reinforcing members 62.

The vertical reinforcing members 61 integrally extended from the rear edges 5111 of the vertical blades 511 respectively, wherein the vertical blades 511 are inclinedly and forwardly extended from the vertical reinforcing members 61 respectively. Accordingly, each of the vertical reinforcing members 61 is integrally and downwardly extended from the bottom edge of the surrounding wall 41 of the motor shaft hub 40, wherein when the vertical blades 511 are spun for creating the centrifugal force, the vertical blades 511 will be broken accidentally. Therefore, the vertical reinforcing members 61 will enhance the strength of the vertical blades 511 when the motor shaft hub 40 is rotated.

The horizontal reinforcing members 62 are integrally and rearwardly extended from the bottom edges 5121 of the horizontal blades 512 respectively, wherein the horizontal blades 512 are inclinedly, upwardly, and forwardly extended from the horizontal reinforcing members 62 respectively. Accordingly, the horizontal reinforcing members 62 are integrally extended from the vertical reinforcing members 61. In particular, inner ends of the horizontal reinforcing members 62 are integrally extended from bottom ends of the vertical reinforcing members 61, such that the vertical reinforcing members 61 are perpendicular to the horizontal reinforcing members 62. Similar to the vertical reinforcing members 61, the horizontal reinforcing members 62 will enhance the strength of the horizontal blades 512 when the motor shaft hub 40 is rotated. It is worth mentioning that the horizontal reinforcing members 62 are suspendedly supported above the bottom wall of the chilling container 10.

Accordingly, the present invention further provides a method of stirring liquid material in the chilling container 10 of the ice-cream or yogurt machine, comprising the following steps.

(1) Drive the motor shaft hub 40 to rotate at the stirring direction. Accordingly, the motor shaft hub 40 is driven to rotate by the motor 20. The motor shaft hub 40 is detachably coupled at the shaft 41 of the motor shaft hub 40 to locate the stirrer arrangement 30 within the chilling container 10.

(2) Create the radial stirring vortex within the chilling container 10 by the blade members 51 radially and outwardly extended from the motor shaft hub 40 when the motor shaft hub 40 is rotated. Accordingly, when the motor shaft hub 40 is rotated, the vertical blades 511 and the horizontal blades 512 are spun, such that the liquid material is whirled by the vertical inclined pushing surfaces 5011 and the horizontal inclined pushing surfaces 5012. Therefore, through the radial stirring vortex, the liquid material in the chilling container 10 is outwardly, radially, and upwardly pushed from the bottom of the chilling container 10 to the top thereof and to inwardly, radially, and downwardly sucked from the top of the chilling container 10 to the bottom thereof.

It is worth mentioning that the stirrer arrangement 30 of the present invention is able to incorporate with any existing ice-cream or yogurt machine. For example, the original stirrer can be replaced by the stirrer arrangement 30 of the present invention.

Figure 6:
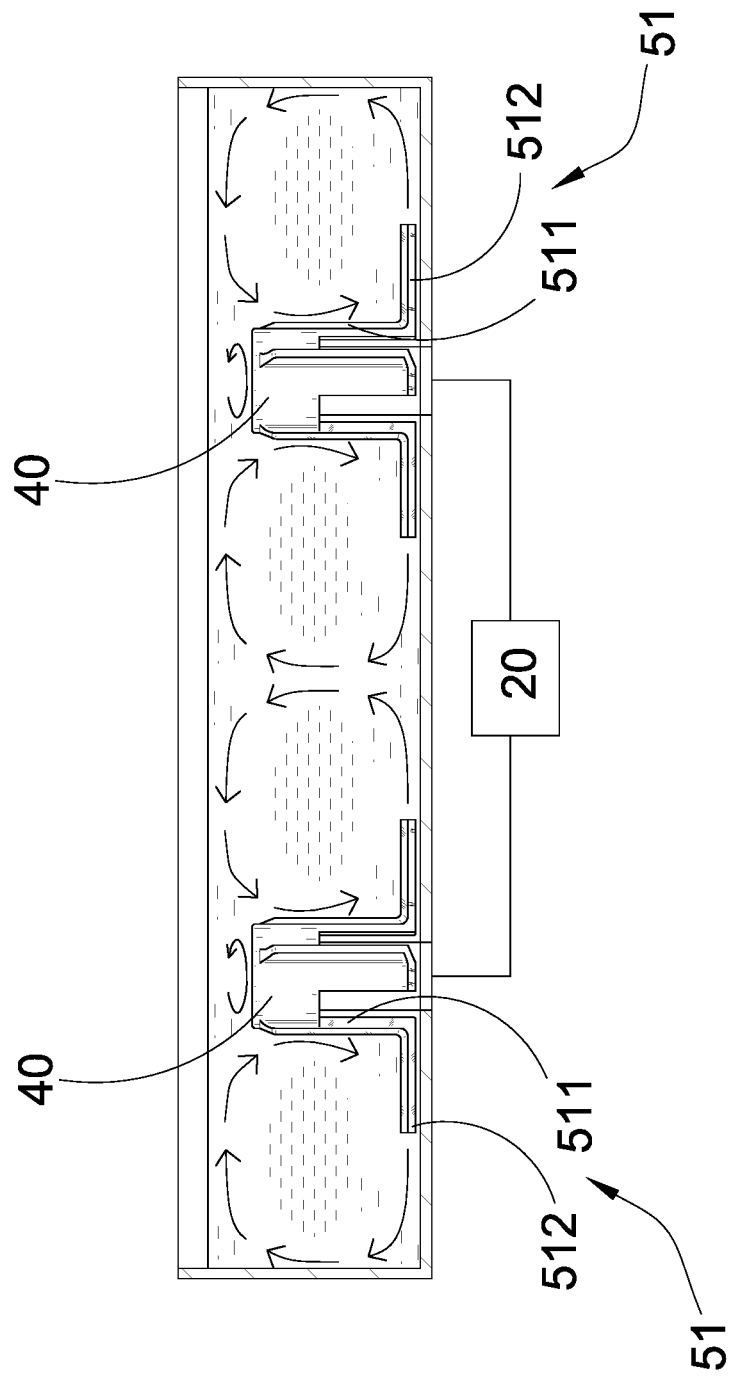
FIG. 6 illustrates two stirring arrangements being used in the chilling container according to the above preferred embodiment of the present invention.

According to the preferred embodiment, when one single stirrer arrangement 30 is used, the stirrer arrangement 30 is preferably supported at a center of the chilling container 10. It is appreciated that two or more stirrer arrangements 30 are used, the stirrer arrangements 30 are spacedly supported in the chilling container 10 side-by-side, as shown in FIG. 6, such that two radial stirring vortexes will be created in the chilling container 10. It is appreciated that the stirrer arrangements 30 can be operatively linked to one single motor 20. The stirrer arrangement 30 can also be incorporated with other machine to effectively stir the viscous liquid material.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A stirrer arrangement for an ice-cream or yogurt machine which comprises a chilling container and a motor, comprising: a motor shaft hub adapted for coupling at a shaft of the motor within the chilling container, wherein said motor shaft hub is driven to rotate at a stirring direction; and a stirring blade unit which comprises a plurality of blade members radially and outwardly extended from said motor shaft hub, wherein each of said blade members has an inclined pushing surface, such that when said motor shaft hub is rotated at said stirring direction, a vertical blade downwardly extended from said motor shaft hub and a horizontal blade extended from a bottom end of said vertical blade, such that said inclined pushing surface at said vertical blade serves a vertical inclined pushing surface and said inclined pushing surface at said horizontal blade serves as a horizontal inclined pushing surface, said blade members are spun for creating a radial stirring vortex within the chilling container to outwardly, radially, and upwardly push liquid material from a bottom of the chilling container to a top thereof and to inwardly, radially, and downwardly suck the liquid material from the top of the chilling container to the bottom thereof.

2. The stirrer arrangement, as recited in claim 1, wherein said horizontal blade has a bottom edge and a top edge upwardly and forwardly extended from said bottom edge at said stirring direction to form said horizontal inclined pushing surface between said bottom edge and said top edge.

3. The stirrer arrangement, as recited in claim 2, wherein said vertical blade has a rear edge and a front edge radially and forwardly extended from said rear edge at said stirring direction to form said vertical inclined pushing surface between said rear edge and said front edge.

4. The stirrer arrangement, as recited in claim 3, further comprising a plurality of vertical reinforcing members integrally extended from said rear edges of said vertical blades respectively, such that said vertical blades are inclinedly and forwardly extended from said vertical reinforcing members respectively.

5. The stirrer arrangement, as recited in claim 1, further comprising a plurality of horizontal reinforcing members integrally and rearwardly extended from said bottom edges of said horizontal blades respectively, such that said horizontal blades are inclinedly and forwardly extended from said horizontal reinforcing members respectively.

6. The stirrer arrangement, as recited in claim 5, wherein said vertical blade has a rear edge and a front edge radially and forwardly extended from said rear edge at said stirring direction to form said vertical inclined pushing surface between said rear edge and said front edge.

7. The stirrer arrangement, as recited in claim 6, further comprising a plurality of vertical reinforcing members integrally extended from said rear edges of said vertical blades respectively, such that said vertical blades are inclinedly and forwardly extended from said vertical reinforcing members respectively.

8. The stirrer arrangement, as recited in claim 7, wherein said vertical reinforcing members are integrally extended from a bottom edge of said motor shaft hub to said horizontal reinforcing members respectively, such that said vertical reinforcing members are perpendicular to said horizontal reinforcing members.

9. The stirrer arrangement, as recited in claim 8, wherein an upper portion of said vertical blade is integrally and radially extended from an outer circumferential surface of said motor shaft hub and a bottom portion of said vertical blade is downwardly extended below said motor shaft hub.

10. The stirrer arrangement, as recited in claim 1, wherein said vertical blade has a rear edge and a front edge forwardly extended from said rear edge at said stirring direction to form said vertical inclined pushing surface between said rear edge and said front edge.

11. The stirrer arrangement, as recited in claim 10, wherein an upper portion of said vertical blade is integrally and radially extended from an outer circumferential surface of said motor shaft hub and a bottom portion of said vertical blade is downwardly extended below said motor shaft hub.

12. The stirrer arrangement, as recited in claim 1, wherein an upper portion of said vertical blade is integrally and radially extended from an outer circumferential surface of said motor shaft hub and a bottom portion of said vertical blade is downwardly extended below said motor shaft hub.

13. An ice-cream or yogurt machine, comprising: a chilling container for containing liquid material; a motor which comprises a shaft extended upwardly within said chilling container; and a stirrer arrangement, which comprises: a motor shaft hub coupled at said shaft of said motor within said chilling container, wherein said motor shaft hub is driven to rotate at a stirring direction; and a stirring blade unit which comprises a plurality of blade members radially and outwardly extended from said motor shaft hub, wherein each of said blade members has an inclined pushing surface, such that when said motor shaft hub is rotated at said stirring direction, a vertical blade downwardly extended from said motor shaft hub and a horizontal blade extended from a bottom end of said vertical blade, such that said inclined pushing surface at said vertical blade serves a vertical inclined pushing surface and said inclined pushing surface at said horizontal blade serves as a horizontal inclined pushing surface, said blade members are whirled for creating a radial stirring vortex within said chilling container to outwardly, radially, and upwardly push the liquid material from a bottom of said chilling container to a top thereof and to inwardly, radially, and downwardly suck the liquid material from the top of said chilling container to the bottom thereof.

14. The machine, as recited in claim 13, wherein said stirrer arrangement further comprises an upward guiding wall encircling around said stirring blade unit for guiding the liquid material to move upward when said motor shaft hub is rotated.

15. The machine, as recited in claim 14, wherein said guiding wall is integrally formed with an inner wall of said chilling container.

16. The machine, as recited in claim 13, wherein said horizontal blade has a bottom edge and a top edge upwardly and forwardly extended from said bottom edge at said stirring direction to form said horizontal inclined pushing surface between said bottom edge and said top edge, wherein said vertical blade has a rear edge and a front edge radially and forwardly extended from said rear edge at said stirring direction to form said vertical inclined pushing surface between said rear edge and said front edge.

17. The machine, as recited in claim 16, wherein said stirrer arrangement further comprises a plurality of horizontal reinforcing members integrally and rearwardly extended from said bottom edges of said horizontal blades respectively, and a plurality of vertical reinforcing members integrally extended from said rear edges of said vertical blades respectively.

18. The machine, as recited in claim 17, wherein said vertical reinforcing members are integrally extended from a bottom edge of said motor shaft hub to said horizontal reinforcing members respectively, such that said vertical reinforcing members are perpendicular to said horizontal reinforcing members.

19. The machine, as recited in claim 18, wherein an upper portion of said vertical blade is integrally and radially extended from an outer circumferential surface of said motor shaft hub and a bottom portion of said vertical blade is downwardly extended below said motor shaft hub.

20. A method of stirring liquid material in a chilling container of an ice-cream or yogurt machine, comprising the steps of: (a) driving a motor shaft hub of a stirrer arrangement to rotate at a stirring direction; and (b) creating a radial stirring vortex within the chilling container by a plurality of blade members radially and outwardly extended from said motor shaft hub when said motor shaft hub is rotated, wherein each of said blade members has an inclined pushing surface, wherein the step (b) further comprises a step of configuring each of said blade members to have a vertical blade downwardly extended from said motor shaft hub and a horizontal blade extended from a bottom end of said vertical blade, such that said inclined pushing surface at said vertical blade serves a vertical inclined pushing surface and said inclined pushing surface at said horizontal blade serves as a horizontal inclined pushing surface, wherein through said radial stirring vortex, the liquid material in said chilling container is outwardly, radially, and upwardly pushed from a bottom of the chilling container to a top thereof and to inwardly, radially, and downwardly sucked from the top of the chilling container to the bottom thereof.

21. The method, as recited in claim 20, wherein the step (b) further comprises a step of encircling said blade members by an upward guiding wall for guiding the liquid material to move upward when said motor shaft hub is rotated.

22. The method, as recited in claim 21, wherein said guiding wall is integrally formed with an inner wall of said chilling container.

23. The method, as recited in claim 20, wherein said horizontal blade has a bottom edge and a top edge upwardly and forwardly extended from said bottom edge at said stirring direction to form said horizontal inclined pushing surface between said bottom edge and said top edge, wherein said vertical blade has a rear edge and a front edge radially and forwardly extended from said rear edge at said stirring direction to form said vertical inclined pushing surface between said rear edge and said front edge.

24. The method, as recited in claim 23, wherein the step (b) further comprises the steps of:
integrally and rearwardly extending a plurality of horizontal reinforcing members from said bottom edges of said horizontal blades respectively; and
integrally extending a plurality of vertical reinforcing members from said rear edges of said vertical blades respectively.

25. The method, as recited in claim 24, wherein said vertical reinforcing members are integrally extended from a bottom edge of said motor shaft hub to said horizontal reinforcing members respectively, such that said vertical reinforcing members are perpendicular to said horizontal reinforcing members.

26. The method, as recited in claim 25, wherein an upper portion of said vertical blade is integrally and radially extended from an outer circumferential surface of said motor shaft hub and a bottom portion of said vertical blade is downwardly extended below said motor shaft hub.

* * * * *